United States Patent
Shen (10) Patent No.: US 9,435,439 B2
(45) Date of Patent: Sep. 6, 2016

(54) AIR MATTRESS DEVICE AND AIR DISCHARGE VALVE THEREOF

(71) Applicant: APEX MEDICAL CORP., New Taipei (TW)

(72) Inventor: Wen Bin Shen, New Taipei (TW)

(73) Assignee: APEX MEDICAL CORP., New Taipei (TW)

( * ) Notice: Subject to any disclaimer, the term of this patent is extended or adjusted under 35 U.S.C. 154(b) by 80 days.

(21) Appl. No.: 14/337,714

(22) Filed: Jul. 22, 2014

(65) Prior Publication Data

US 2015/0034855 A1 Feb. 5, 2015

(30) Foreign Application Priority Data

Jul. 31, 2013 (TW) .............................. 102127374 A (51) Int. Cl.
| | |
|---|---|
| F16K 15/20 | (2006.01) |
| F16K 3/04 | (2006.01) |
| F16K 3/06 | (2006.01) |
| F16K 3/02 | (2006.01) |
| A47C 27/08 | (2006.01) |
| F16K 11/085 | (2006.01) |
| F16K 31/60 | (2006.01) |
| F16K 11/074 | (2006.01) |
| A61G 7/057 | (2006.01) |

(52) U.S. Cl.
CPC ........... *F16K 3/0254* (2013.01); *A47C 27/081* (2013.01); *F16K 11/0743* (2013.01); *F16K 11/0853* (2013.01); *F16K 31/60* (2013.01); *A61G 7/05769* (2013.01)

(58) Field of Classification Search
CPC ........ F16K 11/0743; F16K 3/10; F16K 3/16; F16K 3/186; F16K 3/0254; F16K 31/60
USPC .......... 137/223, 597, 625.18, 625.19, 625.31
See application file for complete search history.

(56) References Cited

U.S. PATENT DOCUMENTS

| | | | | |
|---|---|---|---|---|
| 272,879 | A | * | 2/1883 | Hoag, Sr. ................ F16K 3/186 251/195 |
| 2,209,994 | A | * | 8/1940 | McGill ..................... F16K 3/10 137/625.29 |
| 2,364,697 | A | * | 12/1944 | Daniels ............... F16K 11/0743 137/625.28 |

(Continued)

*Primary Examiner* — Marina Tietjen
*Assistant Examiner* — Seth W Mackay-Smith
(74) *Attorney, Agent, or Firm* — Muncy, Geissler, Olds & Lowe, P.C.

(57) ABSTRACT

An air discharge valve comprises a pipe connection base, a rotary member, at least one seal member and a buffer member. The pipe connection base comprises at least one pipe member which comprises an orifice; the rotary member and the buffer member are both axially connected with the pipe connection base to rotate about a rotation axis relative to the pipe connection base; the rotary member comprises at least one operational part, and the at least one seal member is connected with the rotary member and corresponded to the orifice; the buffer member comprises at least one corresponding operational part, and a rotation buffering space is reserved between each corresponding operational part and each operational part. When the rotary member is at a first orientation relative to the pipe connection base, each seal member correspondingly seals and closes each orifice; when the rotary member is driven by the buffer member and rotated to a second orientation relative to the pipe connection base, each seal member is removed from each orifice so that air in each pipe member can be discharged from the corresponding orifice.

12 Claims, 8 Drawing Sheets

(56) References Cited

U.S. PATENT DOCUMENTS

| | | | | |
|---|---|---|---|---|
| 2,633,325 A * | 3/1953 | Whitlock, Jr. | ............ | F16K 3/10 137/625.31 |
| 2,968,474 A * | 1/1961 | Eichelman | ............ | A61M 16/18 137/625.31 |
| 5,507,315 A * | 4/1996 | Parker | ................ | F16K 11/0743 137/1 |
| 6,152,176 A * | 11/2000 | Lin | ................... | A61G 7/05776 137/624.11 |
| 6,352,105 B1 * | 3/2002 | Serratto | ................... | F24F 3/08 137/597 |
| 7,500,490 B2 * | 3/2009 | Wagner | .............. | B01D 53/0446 137/312 |
| 7,631,505 B2 * | 12/2009 | Seitz | ........................ | F16K 3/10 251/129.11 |
| 7,819,948 B2 * | 10/2010 | Wagner | .............. | C01B 13/0259 137/616.7 |
| 2008/0308079 A1 * | 12/2008 | Albert | ................ | F02M 25/0729 123/568.11 |

* cited by examiner

AIR MATTRESS DEVICE AND AIR DISCHARGE VALVE THEREOF

CROSS-REFERENCE TO RELATED APPLICATIONS

This Application claims priority of Taiwan Patent Application No. 102127374, filed on Jul. 31, 2013, the entirety of which is incorporated by reference herein.

FIELD OF THE INVENTION

The present invention relates to an air discharge valve and more particularly to an air discharge valve for an air mattress device.

BACKGROUND OF THE INVENTION

For patients suffering from bedsores, lying in one position for too long a time on an ordinary mattress will worsen the injury due to continuous pressure applied to soft tissues. In order to improve the situation, medical organizations usually replaces ordinary mattresses with airbeds or air mattresses, by which proper pressure redistribution or adjustment can alleviate local pressure concentration of the mattresses and increase lying comfort of the patients.

When there is an emergency to perform cardiopulmonary resuscitation (CPR) on the patient, however, rapid deflation of the airbed is essential, and the air discharge device of the airbed is much important.

For some conventional airbeds, rubber plugs are used to block air discharge orifices and are unplugged or removed to deflate the airbeds. It is time-consuming and unsatisfactory to deflate the larger airbed just by removal of rubber plugs. Therefore, some airbeds are equipped with a one-way air discharge valve to facilitate deflation. Compared with rubber plugs, one-way air discharge valves are more convenient and efficient for deflation, because air in the airbed can be discharged or released by simply switching the air discharge valve to the ON position, providing more desirable deflation or air discharge performance.

In order to enable convenient operation, most air discharge valves are arranged at the periphery or lateral side of the airbed during the assembly or production of an airbed such as by arranging a rotary cover and a rotary base of the air discharge valve at two opposite sides of the bedspread fabric. Accordingly, when a patient gets into or off the airbed or moves along the airbed, the rotary cover may be easily moved or rotated due to the stretched bedspread fabric, making the rotary cover drive the rotary base to move or rotate relative to the pipe connection base and resulting in mis-switching of the valve and unintentional deflation. Thus, the conventional air discharge valve needs to be handled with extreme care.

Accordingly, there is a need for an air discharge valve which could effectively prevent mis-operation or mis-switching of users.

SUMMARY OF THE INVENTION

It is a primary objective of this invention to provide an air discharge valve for an air mattress device.

To achieve the objective recited above, this invention provides an air discharge valve comprising a pipe connection base, a rotary member, at least one seal member and a buffer member. The pipe connection base comprises at least one pipe member which comprises an orifice; the rotary member is axially connected with the pipe connection base to be rotatable relative to the pipe connection base about a rotation axis and comprises at least one operational part. The at least one seal member is connected with the rotary member and corresponded to the orifice. The buffer member is axially connected with the pipe connection base for driving the rotary member to rotate about the rotation axis relative to the pipe connection base. The buffer member comprises at least one corresponding operational part spaced apart from the operational part by a rotation buffering space to regulate the buffer member driving the rotation of the rotary member about the rotation axis. Each seal member correspondingly closes each orifice when the rotary member is arranged at a first orientation or state relative to the pipe connection base, and each seal member is removed from each corresponding orifice when the rotary member is driven by the buffer member and rotated to a second orientation or state relative to the pipe connection base such that air from each pipe member is discharged from the corresponding orifice.

This invention further provides an air mattress device comprising the above-recited air discharge valve which enables the air mattress device to deflate rapidly.

Accordingly, in the air discharge valve of this invention, a rotation buffering space is reserved between the operational part of the rotary member and the corresponding operational part of the buffer member, so as to buffer, mediate, intervene or regulate the operation of the air discharge valve and prevent mis-operation or mis-switching of users and the resulted unintentional deflation or air discharge. Only when the buffer member is acted by a force greater than a certain degree or intensity by users will the corresponding operational part of the buffer member drive the operational part of the rotary member and switch the air discharge valve to the deflation or air discharge orientation. Therefore, the aforesaid structural configuration may increase the safety in use of the air discharge valve.

It is to be understood that both the foregoing general description and the following detailed description are exemplary and explanatory only and are not restrictive of the invention as defined in the claims.

BRIEF DESCRIPTION OF THE DRAWINGS

A more complete understanding of the subject matter can be derived by referring to the detailed description and claims when considered in conjunction with the following figures, wherein like reference numbers refer to similar elements throughout the figures.

DETAILED DESCRIPTION OF THE INVENTION

Embodiments are illustrated in the accompanying figures to improve understanding of concepts as presented herein. Skilled artisans appreciate that elements in the figures are illustrated for simplicity and clarity and have not necessarily been drawn to scale. For example, the dimensions of some elements in the figures may be exaggerated relative to others to facilitate understanding of the embodiments.

Since various aspects and embodiments are merely exemplary and not limiting, after reading this specification, skilled artisans appreciate that other aspects and embodiments are possible without departing from the scope of the invention. Other features and benefits of any one or more of the embodiments will be apparent from the following detailed description and the claims.

The use of "a" or "an" is employed to describe elements and components described herein. This is done merely for convenience and to give a general sense of the scope of the invention. Accordingly, this description should be read to include one or at least one and the singular also includes the plural unless it is obvious that it is meant otherwise.

As used herein, the terms "comprises," "comprising," "includes," "including," "has," "having" or any other variation thereof are intended to cover a non-exclusive inclusion. For example, a component, structure, article, or apparatus that comprises a list of elements is not necessarily limited to only those elements but may include other elements not expressly listed or inherent to such component, structure, article, or apparatus. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present).

As used herein, the term "connect," "connected," "connected to" or "connected with" means "combined, joined, linked or assembled together," and includes direct connection where no intermediate (e.g. a gasket or washer) exists and indirect connection where an intermediate exists between two elements to be connected. In addition, when different components are connected, these components may form an integral, one-piece structure such as by integration in which different components act as different parts of the integral structure, or these components may be distinct and separate components connected together. Unless otherwise specified, means for joining distinct and separate components together includes interlocking, engagement, fastening, mortise and tenon joint, or any other connection means known and understood in the mechanical arts.

Figure 1:
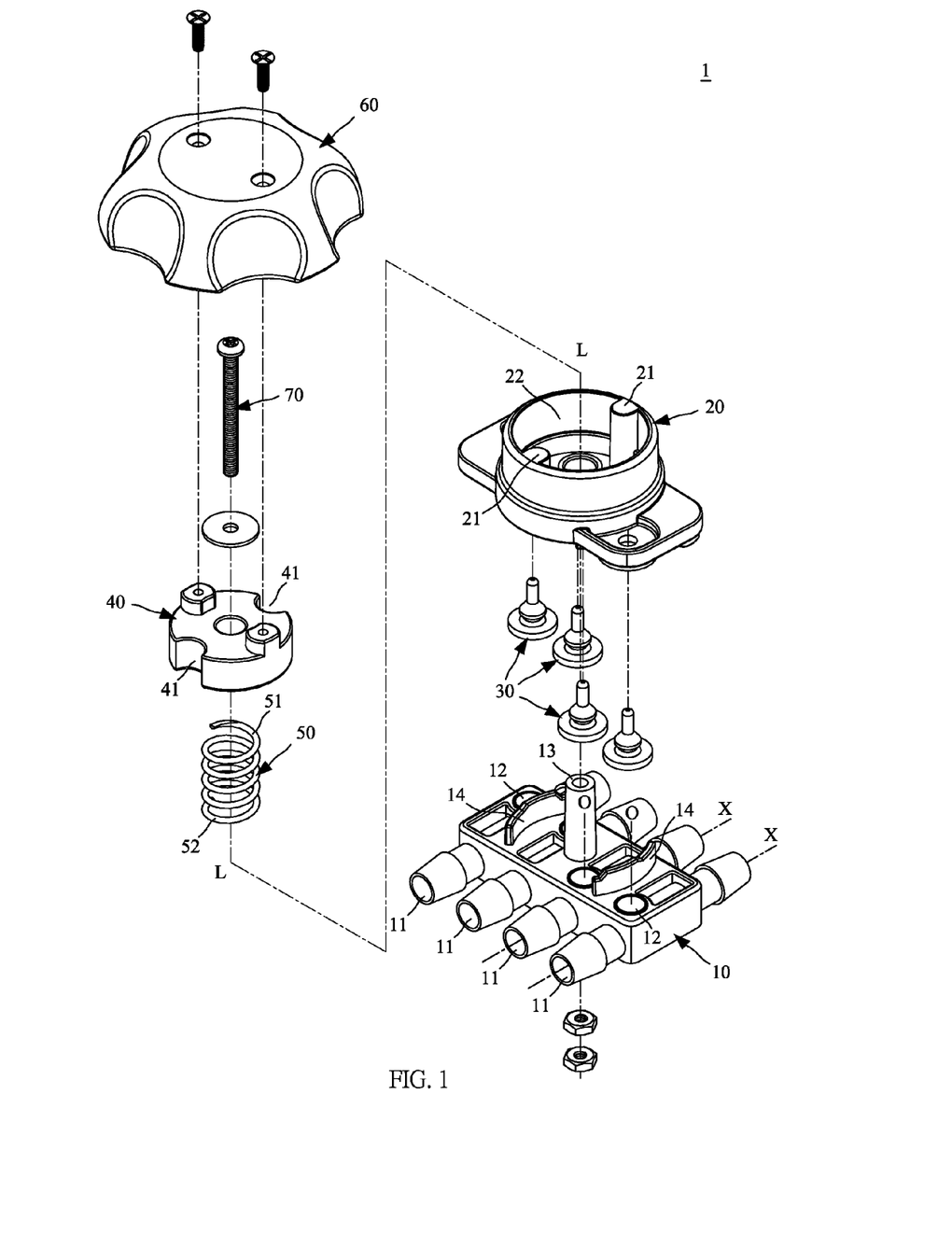
FIG. 1 illustrates an exploded view showing the air discharge valve of one embodiment according to this invention.
Figure 2:
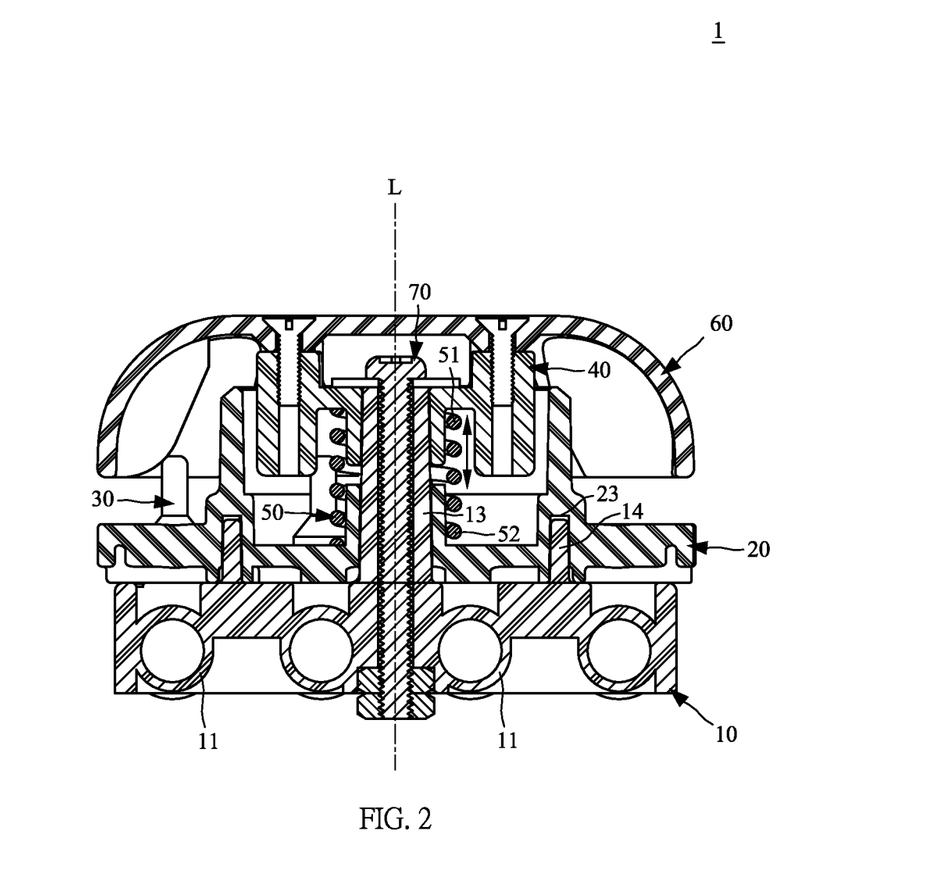
FIG. 2 illustrates a cross-sectional view of the air discharge valve of one embodiment according to this invention.

As shown in FIGS. 1 and 2, the air discharge valve 1 according to the present invention mainly comprises a pipe connection base 10, a rotary member 20, at least one seal member 30 and a buffer member 40. The pipe connection base 10 comprises at least one pipe member 11 and at least one orifice 12; two ends of each pipe member 11 are open ends to allow air passage therethrough. Each orifice 12 is formed correspondingly to each pipe member 11, and each orifice 12 has a central axis O substantially perpendicular to the axial direction X of the corresponding pipe member 11 such that air running through the pipe member 11 can be discharged and released from the orifice 12. In one embodiment of this invention, the pipe connection base 10 comprises a plurality of pipe members 11 arranged side by side. As shown in FIG. 1, for example, the pipe connection base 10 comprises four pipe members 11 and four correspondingly arranged orifices 12, but this invention is not limited thereto.

The pipe connection base 10 further comprises a securing part 13 elongated from the pipe member 11 side at the rotation axis L as a cylindrical structure. The securing part 13 enables the pipe connection base 10 to be axially connected with the rotary member 20 and/or the buffer member 40. In addition, the pipe connection base 10 also comprises at least one restraining part 14 engageable with a corresponding structure of the rotary member 20 to restrain the rotation angle of the rotary member 20 relative to the pipe connection base 10.

The rotary member 20 is axially connected with the pipe connection base 10 in such a manner that, for example, the rotary member 20 is passed through at its center by the securing part 13 of the pipe connection base 10, such that the rotary member 20 is rotatable relative to the pipe connection base 10 about the rotation axis L which is substantially parallel to the central axis O of each orifice 12. The rotary member 20 comprises at least one operational part 21 and a receiving chamber 22. Each operational part 21 may be received or formed in the receiving chamber 22, and the receiving chamber 22 may also receive or accommodate the buffer member 40, such that the rotary member 20 may engage or interact with the buffer member 40 using the operational part 21. In this invention, the amount and position of the operational part 21 may vary in different structural designs to meet different needs. In addition, the rotary member 20 further comprises at least one corresponding restraining part 23 which is operable correspondingly to the restraining part 14 of the pipe connection base 10. In this embodiment, the restraining part 14 has a rib-like structure, and the corresponding restraining part 23 is a guide slot for receiving the rib-like structure. In other embodiments, for example, the structural configuration of the restraining part 14 and the corresponding restraining part 23 may be changed oppositely, such that the restraining part 14 is a guide slot and the corresponding restraining part 23 is a rib-like structure corresponding to the guide slot.

Moreover, in the embodiment illustrated in FIG. 1, the restraining part 14 is a rib-like structure with a step or height variation or difference, wherein the height of one portion is greater than that of the other portions, and an inclined plane structure is formed at the step or between the portions of different height. For example, as shown in FIG. 1, the left and right portions of the restraining part 14 are shorter or lower than the middle portion, and an inclined plane is formed connecting different portions. On the other hand, the corresponding restraining part 23, such as a guide slot, may be provided with a corresponding or similar structure. Accordingly, when the air discharge valve 1 has not been switched on, the shorter portion of the restraining part 14 is in contact and corresponded with the protruded or higher portion of the corresponding restraining part 23, such as the protruded bulge in the guide slot, thereby maintaining the airtight or sealed state of the air discharge valve 1. To carry out deflation or gas discharge, the rotary member 20 is rotated to initiate relative movement between the inclined plane of the corresponding restraining part 23 and the inclined plane of the restraining part 14, making the rotary member 20 elevated or lifted relative to the pipe connection base 10 so that the seal member 30 is slightly separated from the orifice 12 below it to temporarily relieve the airtight seal to facilitate rotation; after that, when the user keeps rotating the rotary member 20 by a certain angle, the taller or protruded portion of the corresponding restraining part 23 is moved and then corresponded to the shorter portion at the other side of the restraining part 14, such that the rotary member 20 is descended from the elevated position relative to the pipe connection base 10 and oriented at a deflation state relative to the pipe connection base 10.

The at least one seal member 30 is combined with the rotary member 20, and the amount and position of the seal member 30 on the rotary member 20 are corresponded to and matched with those of the orifice 12 of the pipe connection base 10.

Figure 3A:
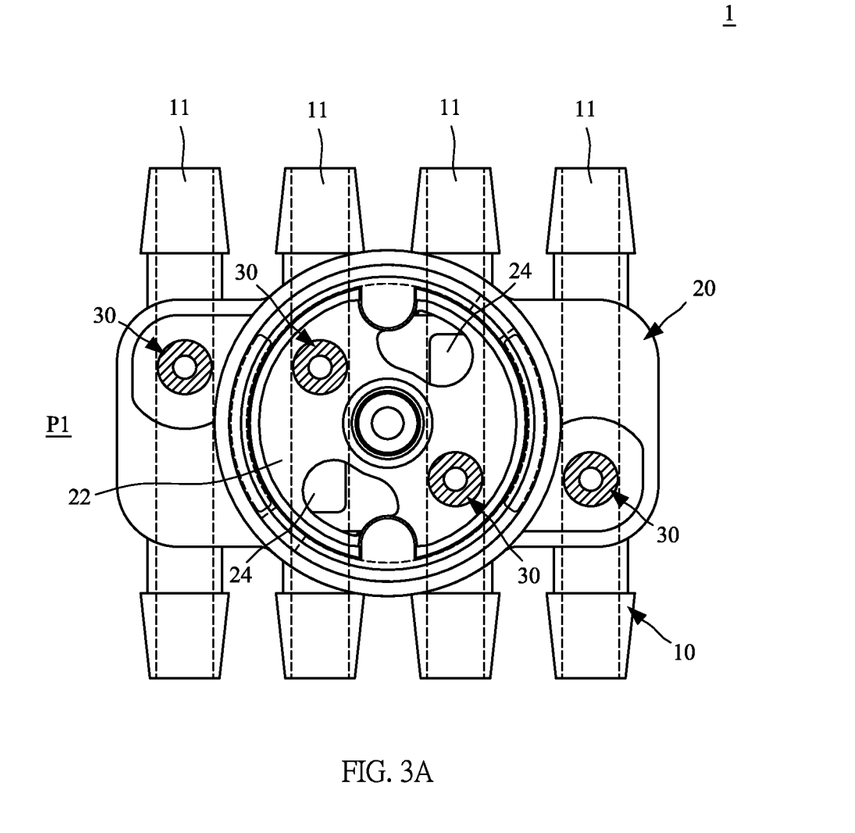
FIG. 3A illustrates the rotary member at a first orientation relative to the pipe connection base of the air discharge valve of one embodiment according to this invention.
Figure 3B:
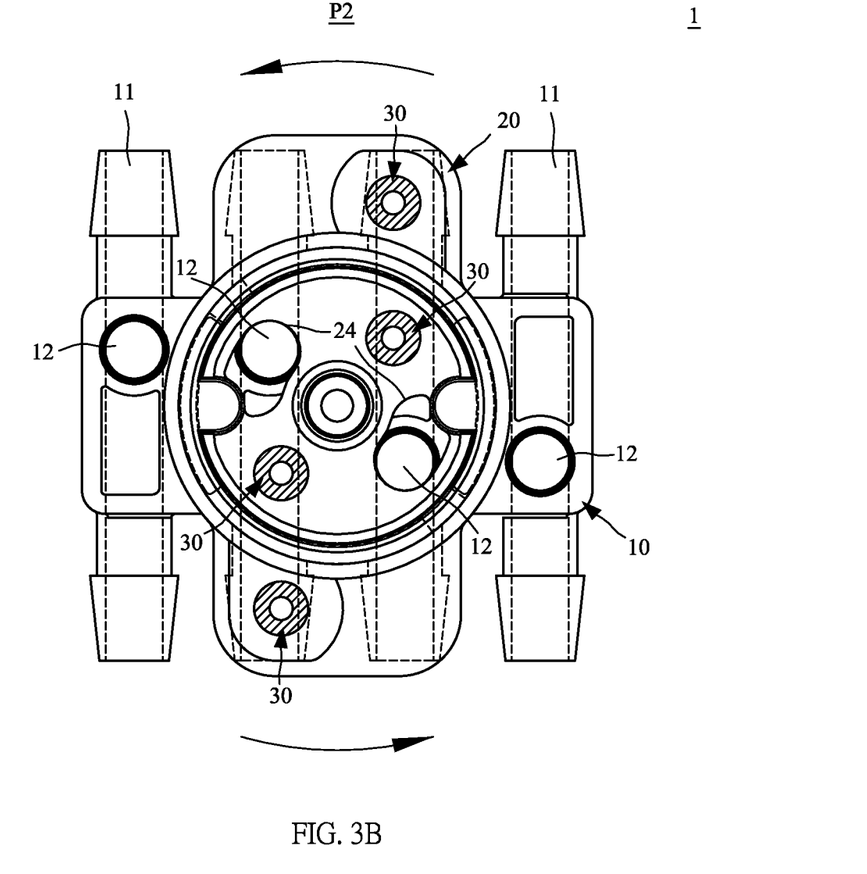
FIG. 3B illustrates the rotary member at a second orientation relative to the pipe connection base of the air discharge valve of one embodiment according to this invention.

Refer now to FIGS. 1, 3A and 3B, wherein FIG. 3A illustrates the rotary member 20 at a first orientation P1 relative to the pipe connection base 10, and FIG. 3B illustrates the rotary member 20 at a second orientation P2 relative to the pipe connection base 10.

As illustrated in FIGS. 1 and 3A, in one embodiment of this invention, the rotary member 20 is provided with four seal members 30 to match the four orifices 12 of the pipe connection base 10. When the rotary member 20 is at the first orientation P1 relative to the pipe connection base 10, as illustrated in FIG. 3A, the position of each seal member 30 connected to the rotary member 20 is corresponded to the position of each orifice 12, and the air discharge valve 1 of this invention is at an OFF or airtight state because each orifice 12 is sealed by each seal member 30 to prevent leakage or release of air in the pipe member 11 from the orifices 12. In this embodiment, the rotary member 20 further comprises a plurality of openings 24 individually arranged at the bottom of the receiving chamber 22.

As illustrated by FIGS. 3A and 3B, after the rotary member 20 is rotated relative to the pipe connection base 10 by, for example, 90 degrees, the rotary member 20 is switched to the second orientation P2 relative to the pipe connection base 10, as shown in FIG. 3B, where each seal member 30 originally sealing and closing each orifice 12 is removed from the orifice 12 by the rotation of the rotary member 20, and each orifice 12 is no longer covered and sealed. As shown in FIG. 3B, each orifice 12 not sealed by the seal member 30 is exposed by the opening 24, through which the corresponding pipe member 11 is in gas communication with the atmosphere. In FIG. 3A, each orifice 12 covered and sealed by the seal member 30, through the rotational movement of the above-mentioned opening 24, is no longer sealed, thereby forming gas communication between the corresponding pipe member 11 and the atmosphere through the orifice 12, such that the air discharge valve 1 becomes an ON or deflation state where air from each pipe member 11 is discharged from the corresponding orifice 12.

In one embodiment, when the rotary member 20 is at the first orientation P1 relative to the pipe connection base 10, the longitudinal axes, which represent the elongation axes for elongated structures, of the two components define an angle of 0 degree therebetween; when the rotary member 20 is at the second orientation P2 relative to the pipe connection base 10, an angle defined between the longitudinal axes of the two components is greater than 0 degree and less than or equal to 90 degrees, such as 30, 60 or 90 degrees.

As shown by FIGS. 1 and 2, the buffer member 40 is also axially connected with the pipe connection base 10 at the rotation axis L, such as by sleeving the buffer member 40 on the securing part 13 of the pipe connection base 10, and the buffer member 40 is disposed in the receiving chamber 22 of the rotary member 20, such that a coaxial linkage is formed between the buffer member 40 and the rotary member 20. The buffer member 40 is rotatable relative to the pipe connection base 10 and/or the rotary member 20 and comprises at least one corresponding operational part 41, wherein the amount, position and structure of the corresponding operational part 21 are all corresponded to the operational part 21 of the rotary member 20.

For example, if the operational part 21 is a protrusion structure, the corresponding operational part 41 may be a concave structure corresponding to the protrusion structure, such that the operational part 21 and the corresponding operational part 41 are engageable with respect to each other during the rotation of the buffer member 40 relative to the rotary member 20, such that the rotary member 20 may be driven by the buffer member 40 to rotate when the buffer member 40 is manipulated by a force greater than a certain degree or intensity. It should be noted that, however, the structural configuration of the operational part 21 and the corresponding operational part 41 may be changed oppositely; for example, the operational part 21 may have a concave structure, and the corresponding operational part 41 has a protrusion structure corresponding to the concave structure. Alternatively, other engageable structure pairs can also be employed as the operational part 21 and the corresponding operational part 41.

Figure 4A:
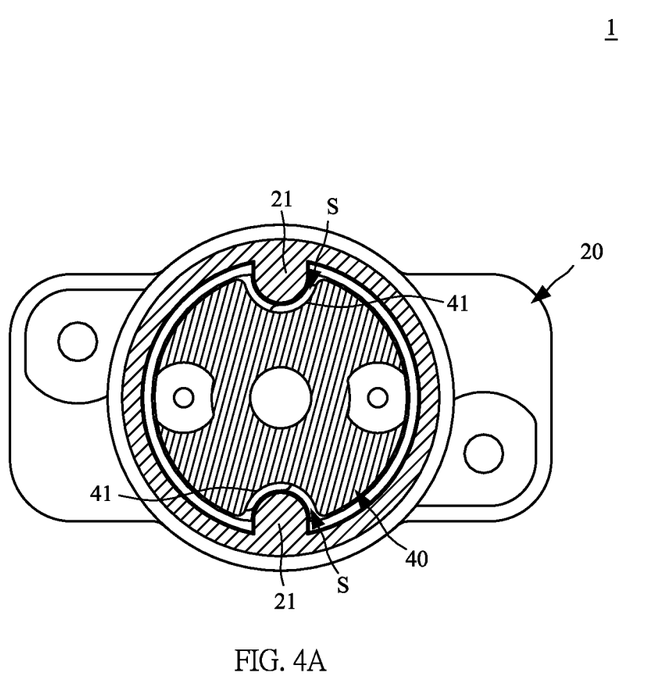
FIG. 4A illustrates the relationship of the buffer member and the rotary member at one state of the air discharge valve of one embodiment according to this invention.
Figure 4B:
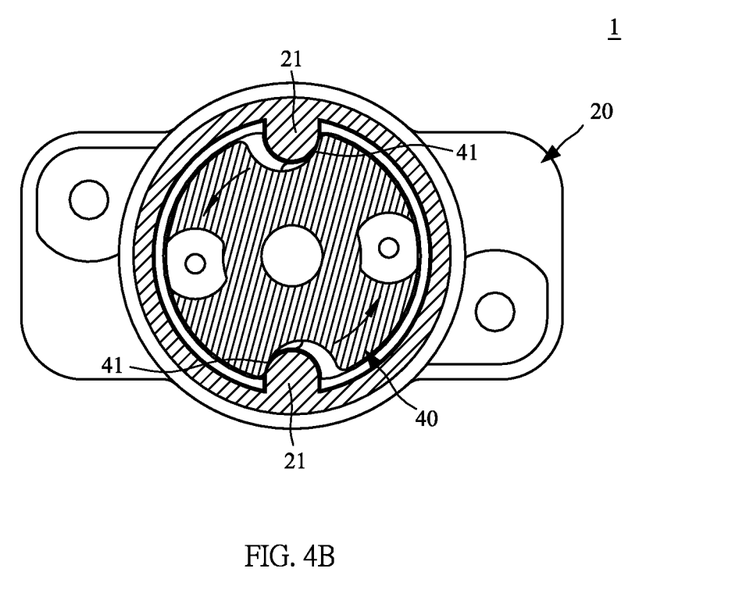
FIG. 4B illustrates the corresponding operational part of the buffer member engaging and abutted against the operational part of the rotary member of the air discharge valve of one embodiment according to this invention.
Figure 4C:
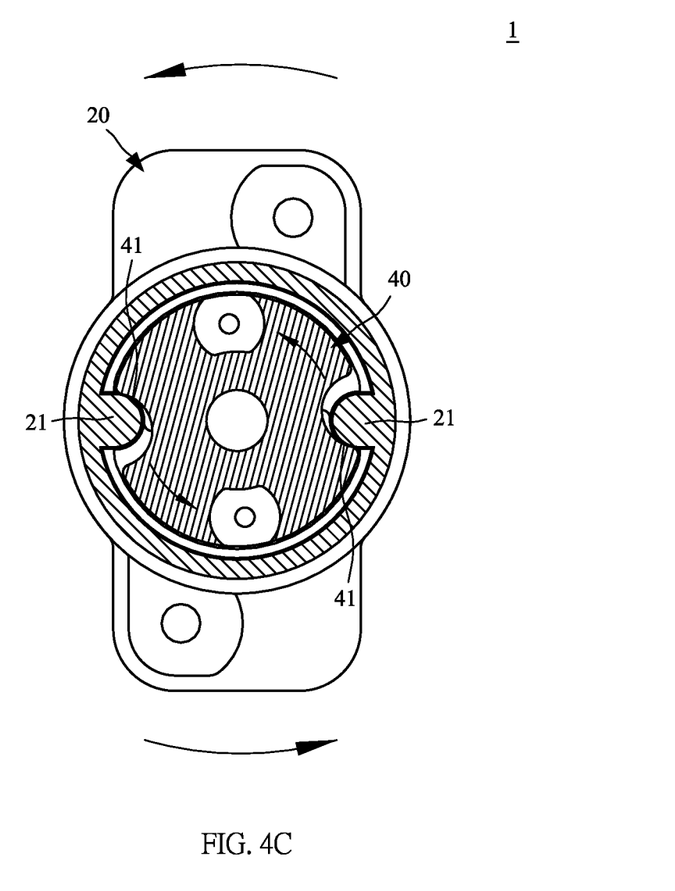
FIG. 4C illustrates the buffer member driving the rotary member to rotate of the air discharge valve of one embodiment according to this invention.

FIGS. 4A to 4C illustrate the relative orientation of the rotary member 20 and the buffer member 40 at different operational states of the air discharge valve 1. As shown in FIG. 4A, when the air discharge valve 1 of this invention has not been manipulated, as corresponding to the first orientation P1 of the rotary member 20 relative to the pipe connection base 10 illustrated in FIG. 3A, there is a rotation buffering space S between the buffer member 40 and the rotary member 20. In this circumstance, the buffer member 40 is rotatable relative to the rotary member 20, and the rotation of the buffer member 40 in the rotation buffering space S will not cause any operational effect on the rotary member 20. Therefore, the air discharge valve 1 may provide rotational buffer and tolerance for mis-operation or mis-switching of users and be prevented from unintentional actuation.

As illustrated in FIG. 4B, when the buffer member 40 is rotated relative to the rotary member 20 beyond the rotation buffering space S, the corresponding operational part 41 of the buffer member 40 comes in contact with the operational part 21 of the rotary member 20. In this situation, given that the user intentionally imposes greater force to the buffer member 40, the buffer member 40 will drive the rotary member 20, resulting in co-rotation of the rotary member 20 and the buffer member 40. Meanwhile, the user may keep rotating the buffer member 40 to drive the rotary member 20 to the orientation shown in FIG. 4C, as corresponding to the second orientation P2 of the rotary member 20 relative to the pipe connection base 10 shown in FIG. 3B, so as to discharge air running through the pipe member 11.

Refer now to FIGS. 1 and 2. The air discharge valve 1 of this invention may further optionally comprises an elastic member 50 situated such as between the buffer member 40 and the rotary member 20. The elastic member 50 comprises a first end 51 and a second end 52, wherein the first end is rested on the buffer member 40 and the second end 52 is rested on the bottom of the receiving chamber 22 of the rotary member 20. With the elastic member 50, the buffer member 40 may provide vertical buffer or tolerance for movement at the rotation axis L. In one embodiment of this invention, the elastic member 50 is sleeved and fastened on a part of the securing part 13 of the pipe connection base 10 to avoid displacement.

In addition, in one embodiment, the air discharge valve 1 of this invention may optionally comprise a manipulative member 60, such as a cover, a rotary lid or a rotary button, and the manipulative member 60 may be fastened to the buffer member 40. Thus, when a user imposes force on and rotates the manipulative member 60, the manipulative member 60 may drive the buffer member 40 to rotate about the rotation axis L, such that the buffer member 40 engages the rotary member 20 to switch the rotary member 20 between the first orientation or the second orientation relative to the pipe connection base 10. In this invention, the manipulative member 60 is a cover structure or a rotary button structure, but this invention is not limited thereto.

In one embodiment, the manipulative member 60 may be combined with the buffer member 40. In this case, the torque of rotation of the buffer member 40 driven by the manipulative member 60 about the rotation axis L is determined by the distance, i.e. moment arm, from the rotation axis L to the point of connection of the manipulative member 60 and the buffer member 40. In one example where the buffer member 40 is situated in the receiving chamber 22 of the rotary member 20, as illustrated by FIG. 2, compared with connecting the manipulative member 60 with the rotary member 20 to allow manipulation of the rotary member 20 by the manipulative member 60, the embodiment shown in FIG. 2 has a shortened moment arm, so the torque caused by the same force magnitude, such as due to bedspread fabric stretching, is reduced. Therefore, the airtight or sealed state formed between the seal member 30 and the pipe connection base 10 is resistant to slight movement or rotation and will not be broken easily to result in gas leakage. In addition, the aforesaid embodiment is advantageous because under the airtight state, when the manipulative member 60 is lifted or pressed by a force imposed to one side, since the manipulative member 60 is not in direct linkage with the rotary member 20, the rotary member 20 can be prevented from being affected by the force and mis-operated, and the gas leakage caused by the separation of the seal member 30 from the orifice 12 can also be avoided. In other words, with the presence of the buffer member 40 in conjunction with the buffering space between the buffer member 40 and the rotary member 20, unintentional up-down and left-right movement, deviation and tilting, and rotation of the manipulative member 60 due to bedspread fabric stretching can all be buffered or offset.

The air discharge valve 1 of this invention may optionally comprise a securing member 70, which is passed through the buffer member 40 and the rotary member 20 at the rotation axis L and fastened at the pipe connection base 10 to axially combine the buffer member 40, the rotary member 20 and the pipe connection base 10. In one embodiment of this invention, the securing member 70 is a fastening member fastened within the securing part 13 of the pipe connection base 10, with one end pressing and restraining the buffer member 40 and the other end locked and fastened with the pipe connection base 10.

With the designs elaborated above, when a user unintentionally actuates or manipulates the air discharge valve 1 of this invention, the rotation buffering space may provide buffer for the relative movement between the buffer member and the rotary member, so as to prevent the user from carelessly switching the air discharge valve to the deflation or air discharge position, increase the safety of the airbed in use and enable rapid deflation of the airbed.

Figure 5:
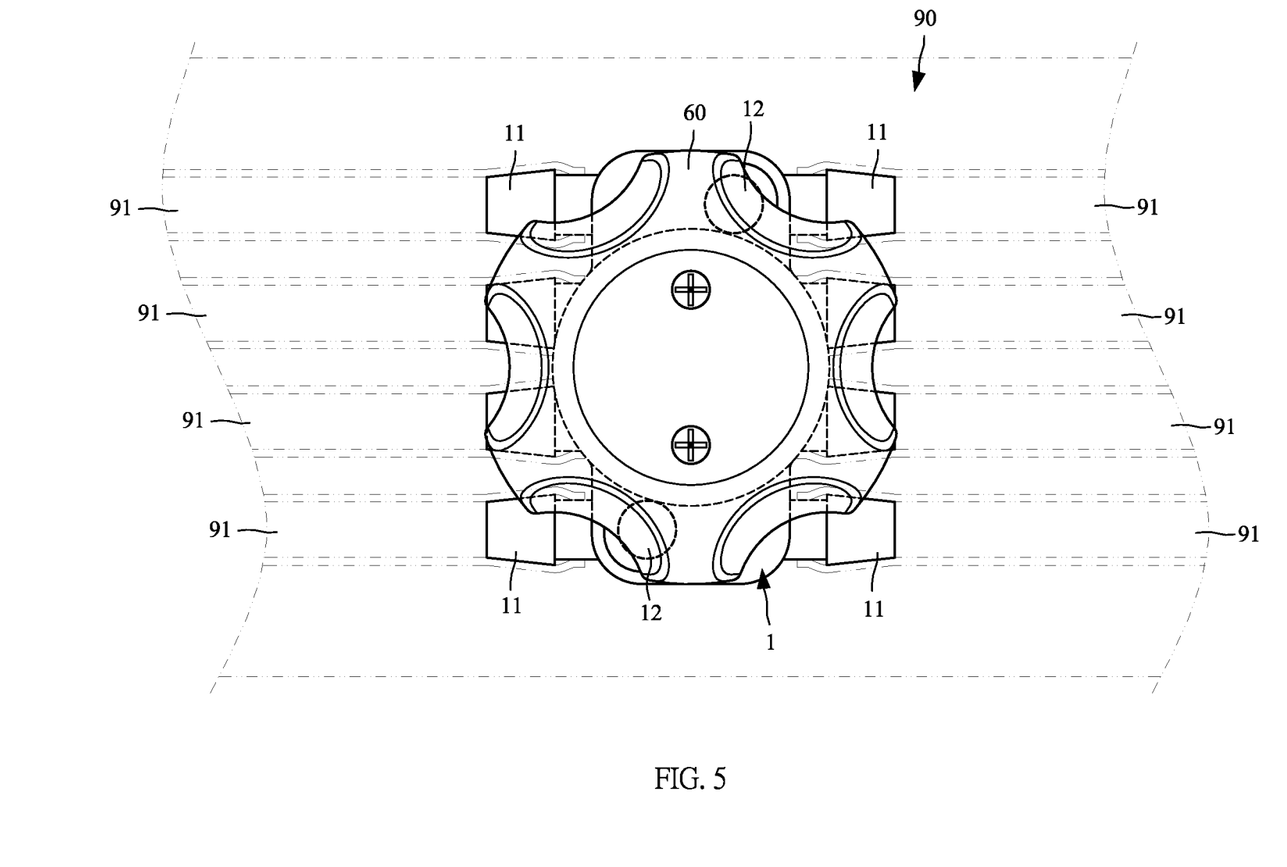
FIG. 5 illustrates the air mattress device containing the air discharge valve of one embodiment according to this invention.

FIG. 5 illustrates a part of an air mattress device, such as an airbed, containing the air discharge valve 1 of this invention. The air mattress device 90 comprises a plurality of air channels 91 respectively connected to the air chambers (not shown) of the air mattress device 90, and each pipe member 11 of the pipe connection base 10 has two open ends individually connected with an air channel 91. After the manipulative member 60 of the air discharge valve 1 is rotated by a user to enable the rotary member 20 at the first orientation P1 as shown in FIG. 3A to rotate to the second orientation P2 as shown in FIG. 3B, the air discharge valve 1 is switched on or opened to discharge the air in the air channels 91 from the orifice 12 of each pipe member 11 and achieve the purpose of rapid deflation.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as preferred or advantageous over other implementations.

Moreover, while at least one exemplary embodiment has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. An air discharge valve, comprising:
   a pipe connection base comprising at least one pipe member which includes an orifice;
   a rotary member axially connected with the pipe connection base, the rotary member being rotatable relative to the pipe connection base about a rotation axis and having at least one operational part;
   at least one seal member connected with the rotary member and corresponding to the orifice; and
   a buffer member axially connected with the pipe connection base, the buffer member being corresponded to the pipe connection base and driving the rotary member to rotate about the rotation axis, the buffer member comprising at least one corresponding operational part, the corresponding operational part being spaced apart from the operational part by a rotation buffering space to regulate the buffer member driving the rotation of the rotary member about the rotation axis;
   wherein the rotary member comprises a receiving chamber for receiving the buffer member, and wherein the at least one operational part is disposed in the receiving chamber;
   wherein the seal member correspondingly closes the orifice when the rotary member is arranged at a first orientation relative to the pipe connection base, and wherein the seal member is removed from the orifice when the rotary member is driven by the buffer member and rotated to a second orientation relative to the pipe connection base such that air from the pipe member is discharged from the orifice.

2. The air discharge valve of claim 1, further comprising an elastic member disposed between the buffer member and the rotary member to regulate the movement of the buffer member at the rotation axis, the elastic member comprising a first end rested on the buffer member and a second end rested on the rotary member.

3. The air discharge valve of claim 1, further comprising a manipulative member fastened with the buffer member to drive the rotary member to rotate about the rotation axis.

4. The air discharge valve of claim 1, wherein the operational part and the corresponding operational part are structurally complementary to each other.

5. The air discharge valve of claim 4, wherein the operational part has a protrusion structure and the corresponding operational part has a concave structure corresponding to the protrusion structure.

6. The air discharge valve of claim 1, wherein the pipe connection base further comprises a securing part extended at the rotation axis and passing through the rotary member.

7. The air discharge valve of claim 1, wherein the orifice has a central axis substantially parallel to the rotation axis and substantially perpendicular to an axial direction of the pipe member.

8. The air discharge valve of claim 1, further comprising a securing member passing through the buffer member and the rotary member at the rotation axis and fastened with the pipe connection base.

9. The air discharge valve of claim 1, wherein the pipe connection base further comprises at least one restraining part, and the rotary member further comprises at least one corresponding restraining part engaging the restraining part to restrain the rotation of the rotary member relative to the pipe connection base.

10. The air discharge valve of claim 9, wherein each of the restraining part and the corresponding restraining part has a step structure and an inclined plane structure.

11. The air discharge valve of claim 1, wherein an angle defined between the rotary member and the pipe connection base longitudinally when the rotary member is arranged at the first orientation relative to the pipe connection base is 0 degree, and wherein the angle defined between the rotary member and the pipe connection base longitudinally when the rotary member is arranged at the second orientation relative to the pipe connection base is 30, 60 or 90 degrees.

12. An airbed comprising the air discharge valve recited in claim 1.

* * * * *